Aug. 1, 1967 T. S. PEARLMAN 3,334,196

SHAPED TELEPHONE BASE ATTACHMENT

Filed Aug. 7, 1964

INVENTOR:
THELMA S. PEARLMAN

BY Russell Foster

ATTORNEY

United States Patent Office 3,334,196

Patented Aug. 1, 1967

3,334,196

SHAPED TELEPHONE BASE ATTACHMENT

Thelma S. Pearlman, Apt. 5–C, 204 San Souci St., Charleston, S.C. 29403

Filed Aug. 7, 1964, Ser. No. 388,236
7 Claims. (Cl. 179—179)

This invention relates to a telephone attachment and more particularly to a telephone attachment for seating and retaining the handset on the base of the telephone.

One type of telephone in use today is a type referred to as a "Princess" telephone which is more compact and more stylishly designed than the conventional type of telephone utilized widely in business offices, residences and the like. This compact telephone dispenses with the usual spaced handset cradling projections or tines of the conventional telephone and the base is suitably formed to seat and to support the handset on its receiving and transmitting elements. The attractive and functional design of this compact telephone makes it suitable for use in areas where style is a prime consideration such as in residential rooms including bedrooms, style conscious business establishments, and the like.

As tines have been omitted from this compact telephone, there is no cradling of the handset as in the conventional telephone. The only support for the handset is provided by suitably formed surfaces on the top of the base which seat and support the handset by engagement with the handset receiving and transmitting elements when the handset is positioned on the base.

However, the use of such support surfaces on the base only for handset seating requires careful and slow replacement of the handset on the base after use for proper positioning. Unfortunately, the typical user of such a telephone frequently replaces the handset in a hurried or careless manner so that the handset receiving and transmitting elements do not properly engage the base support surfaces and the handset is improperly seated. As the spring loaded cylindrical plungers or buttons which operate the telephonoe hookswitch are located in these support surfaces, failure by a user to properly seat the handset results in a failure of the handset to properly depress the buttons and the hookswitch is not actuated for proper conditioning of the telephone for incoming calls.

Furthermore, as the base support surfaces are wall-less throughout a substantial portion of their marginal edges, there is very little structure for retaining the handset on the base so that a slight blow or even when the telephone is jarred, particularly when the handset is improperly seated, results in easy dislodgement of the handset from the base with the attendant adverse effects. In addition, the known inclination for children to consider a telephone as a fascinating toy produces further problems with such a telephone as not only can children easily knock the handset off the base but would be even more likely to improperly replace the handset on the base in the absence of handset guide means such as the tines found on the conventional telephone.

Accordingly, a primary object of this invention is to provide a new and novel attachment for properly seating and retaining the handset on the base of a telephone.

Another object of this invention is to provide a new and novel attachment for a telephone which permits the handset to be supported on the telephone base utilizing its receiving and transmitting elements only but which strongly resists dislodgement of the handset from its position on the base by external forces.

A further object of this invention is to provide a new and novel attachment for a telephone which guides the handset into the proper position on the telephone base even with a hurried or careless user so as to avoid failure of the handset to condition the telephone for the reception of incoming calls.

Still another object of this invention is to provide a new and novel attachment for a telephone which may be made simply and inexpensively of readily available material, which not only functions to properly seal and retain the handset on the base but adds considerably to the stylish appearance of the telephone and which may be provided with suitable indicia to provide an attractive display of information for advertising purposes and the like.

Other objects and advantages of the invention will become apparent from the following description taken in connection with the accompanying drawing.

The objects stated above and other related objects in this invention are accomplished by providing a shaped member such as a strip of material having a wall which is arranged to be positioned on a telephone base containing a pair of support surfaces engageable with the receiving and transmitting elements of the telephone handset. The shape of the strip permits it to be supported in such a position on the base that portions of the wall of the strip extend upwardly from the marginal edges of the base support surfaces to define a pair of wells on the base. When the handset is positioned on the base, the receiving and transmitting elements of the handset are guided into these wells so that the handset is properly seated on the base and retained against dislodgement.

The novel features which are believed to be characteristic of the invention are set forth with particularity in the appended claims. The invention itself, however, both as to its organization and method of operation may be best understood by reference to the following description taken in conjunction with the accompanying drawing in which:

Figures 1, 2, 3, 4, 5:
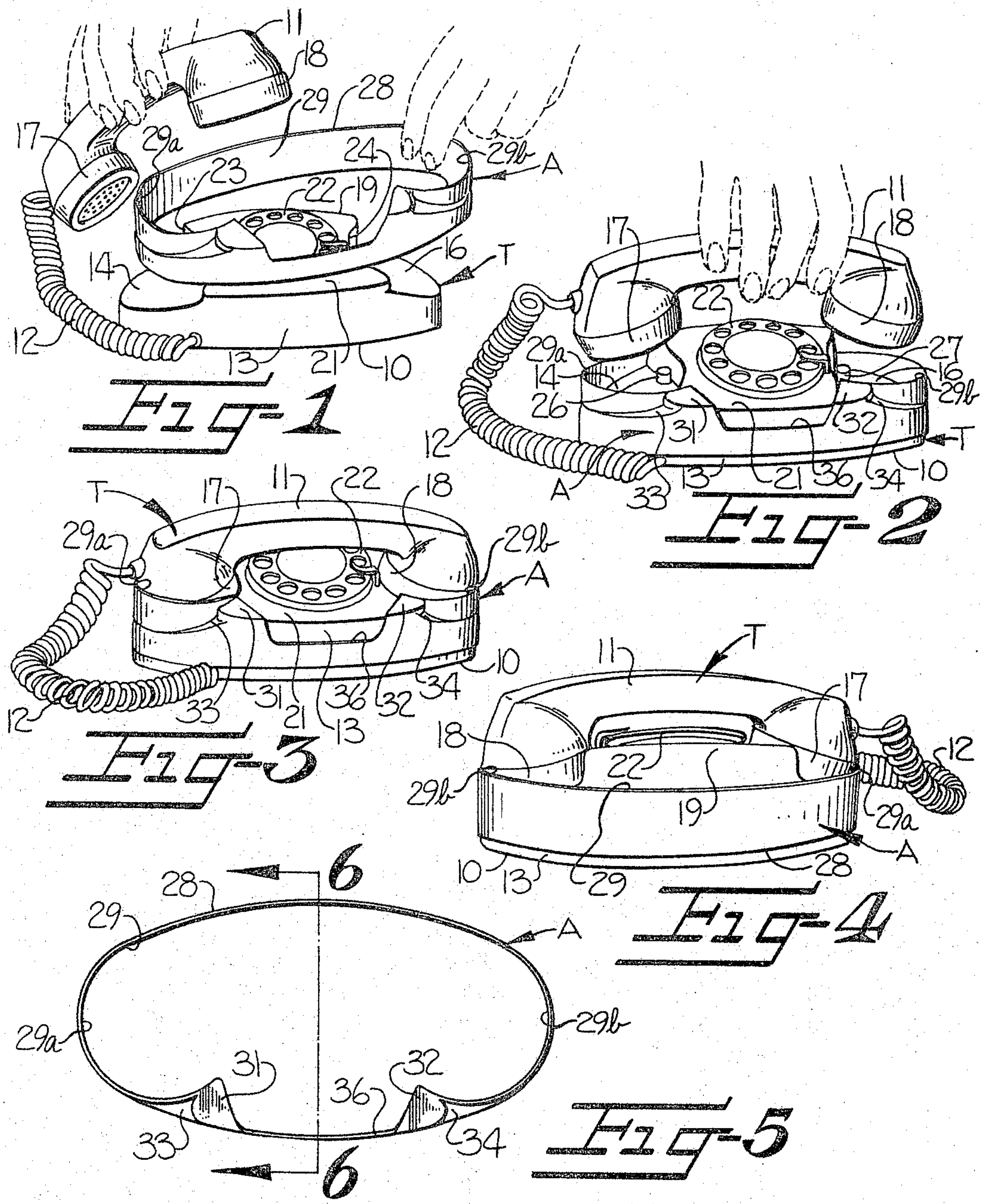
FIGURE 1 is a perspective view showing a step in positioning the attachment of the invention on a telephone.
FIGURE 2 is a perspective view of a telephone containing the attachment of the invention illustrating the positioning of the handset.
FIGURE 3 is a view similar to FIGURE 2 illustrating the handset position on the telephone base.
FIGURE 4 is a rear view of the telephone of FIGURE 3.
FIGURE 5 is a plan view of the attachment of the invention.
Figure 6:
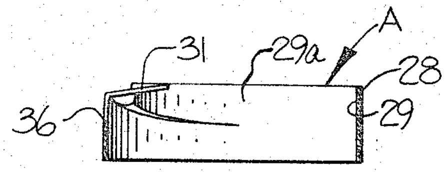
FIGURE 6 is a sectional view taken substantially along line 6—6 of FIGURE 5 in the direction of the arrows.

Referring now to the drawing, there is shown a telephone designated generally by the letter T which is relatively small and compact in comparison with the conventional telephone and which is referred to generally as a Princess telephone. The telephone T includes a base 10 generally elliptical in cross-section to which is connected a handset 11 by means of a cord 12.

The telephone base 10 includes a side wall 13 and has its upper surface suitably contoured to provide a pair of support surfaces 14, 16 positioned at opposite ends of the base. The support surfaces 14, 16 are slightly inclined downward both laterally and forwardly as shown and are suitably spaced to supportingly engage the receiving element 17 and transmitting element 18 respectively of the handset 11 for supporting the handset on the base 10.

The upper surface of the base 10 is also provided with an upstanding dial housing 19 positioned centrally intermediate the ends of the base having a dial panel 21 inclined forwardly downward on which is positioned a suitably supported dial 22. The dial housing 19 also contains contoured side walls 23, 24 adjacent the support surfaces 14, 16, respectively.

The support surfaces 14, 16 each contain a spring loaded cylindrical plunger 26, 27 respectively operatively connected to a hookswitch (not shown) in the well-known manner. When the telephone T is "hung-up" by positioning the receiving and transmitting elements 17, 18 of the handset 11 on the support surfaces 14, 16, the elements 17, 18 engage and depress the plungers 26, 27 against the plunger spring action to condition the telephone for incoming calls.

As specifically illustrative of the invention, a handset retaining atttachment designated generally in FIGURE 5 by the letter A is provided which comprise a shaped member such as a strip 28 having a side wall 29. In the specific embodiment illustrated, the attachment A is an endless strip of elliptical configuration the inner diameter of which is such as to conform generally to the elliptical outline of the telephone base side wall 13. The strip 28 is preferably molded from a suitable material such as plastic or the like in one piece.

Means are provided on the strip 28, preferably formed integrally therewith, for retaining the attachment in position on the telephone as shown in FIGURES 2–4. More specifically, the strip 28 is provided with a pair of integrally formed tabs 31, 32 extending laterally inward from the strip wall 29. To further aid in positioning the attachment A, the strip 28 is contoured adjacent each of the tabs 31, 32 at 33, 34 as shown best in FIGURE 5. The strip 28 is also preferably cut away at 36 as shown.

In the assembly of the attachment A to the telephone T, reference is made to FIGURE 1 wherein is shown the step of positioning the attachment A, the handset 11 having been lifted as shown for access. The attachment A is slipped over the side wall 13 of the telephone base 10 and downward in telescoping relationship with the base until the strip 28 is positioned as shown in FIGURES 2–4. When the attachment A is in the position of FIGURES 2–4, the tabs 31, 32 are in engagement with the dial housing upper panel 21 and the contoured portions 33, 34 of the strip 28 are in engagement with the support surfaces 14, 16 respectively.

In the assembled position of FIGURE 2, it can be seen that portions of the strip wall 29 namely those portions designated by the numeral **29*a*, 29*b* extend vertically upward from the support surfaces 14, 16 and form therewith a well for receiving the handset receiving and transmitting elements 17, 18, respectively. Thus, when the handset 11 is moved as shown in FIGURE 2 downward into supported engagement with the support surfaces 14, 16, the strip wall portions 29*a*, 29*b* serve to guide the handset into the proper position on the base 10 and retain the handset in the position of FIGURES 3, 4 so that dislodgement of the handset by external forces is strongly resisted. If desired, the side wall 29 of strip 28** may be provided with suitable indicia for advertising purposes and the like.

It can be seen that with the novel attachment provided by this invention, there has been overcome a problem characteristic of a particular type of telephone that is, frequent failure of the telephone handset to seat properly when replaced. The attachement of the invention not only guides the handset into proper position on the telephone base so that the switch buttons are properly depressed even though the handset replacement might be done in a hurried or careless manner but also acts to retain the handset on the base when the telephone is subjected to severe jarring or to blows on the handset such as might occur accidentally or by children and the like. In addition, the attachment of the invention detracts in no way from the stylish appearance of the type of telephone to which it is applied as it is appropriately contoured so as to appear actually as part of the telephone. The attachment is of simple construction and may be easily and neatly positioned on the telephone base and can be formed of thin, inexpensive plastic material which may be colored appropriately to conform to the color of the telephone so as to blend inconspicuously therewith. The attachment of the invention is particularly suitable for displaying advertising material or other information and may be made at such a low cost as to be highly suitable as an advertising item.

While there has been described what at present is considered to be the preferred embodiment of the invention, it will be understood by those skilled in the art that various changes and modifications may be made therein without departing from the invention and, therefore, it is the aim of the appended claims to cover all such changes and modifications as fall within the true spirit and scope of the invention.

Having thus described the invention, what is claimed is:

1. An attachment for a telephone including a base having a pair of support surfaces engageable with the receiving and transmitting elements of a handset positioned on said base comprising, in combination, a shaped member having a wall arranged to be positioned on said base with portions of said wall extending upwardly from said support surfaces, said upwardly extending wall portions forming with each of said support surfaces a well for guidably receiving and retaining the receiving and transmitting elements of a handset positioned on said base.

2. An attachment for a telephone including a base having a pair of support surfaces engageable with the receiving and transmitting elements of a handset positioned on said base comprising, in combination, a shaped strip of material having a wall arranged to be positioned on said base with portions of said wall extending upwardly from said support surfaces, said upwardly extending wall portions forming with each of said support surfaces a well for guidably receiving and retaining the receiving and transmitting elements of a handset positioned on said base.

3. An attachment for a telephone including a base having a pair of support surfaces engageable with the receiving and transmitting elements of a handset positioned on said base comprising, in combination, a shaped strip of material having a wall arranged to be positioned on said base with portions of said wall extending upwardly from the marginal edges of said support surfaces, means on said strips engageable with said base for supporting said strip in a predetermined position on said base, said upwardly extending wall portions forming with each of said support surfaces a well for guidably receiving and retaining the receiving and transmitting elements of a handset positioned on said base.

4. An attachment for a telephone including a base having a pair of support surfaces engageable with the receiving and transmitting elements of a handset positioned on said base comprising, in combination, a shaped strip of material having a wall, said strip arranged to be positioned on said base in telescoping relationship therewith, means formed integrally with said strip engageable with the upper surface of said base for retaining said strip in a predetermined vertical position with portions of said strip wall extending upwardly from the marginal edges of said support surfaces, said upwardly extending wall portions forming with each of said support surfaces a well for guidably receiving and retaining the receiving and transmitting elements of a handset positioned on said base.

5. An attachment in accordance with claim 4 wherein said strip retaining means includes integrally formed laterally projecting tabs on said strip.

6. An attachment in accordance with claim 4 wherein said shaped strip is an endless strip of molded plastic material.

7. An attachment for a telephone including a base of generally elliptical horizontal cross-sectional shape having a side wall, a pair of forwardly inclined support surfaces at opposite ends of said base engageable with the receiving and transmitting element of a handset positioned on said base and a dial panel intermediate said support surfaces comprising, in combination, an endless band of molded plastic material having a wall and arranged to be positioned in telescoping relationship with the side wall of said base, a pair of integrally formed inwardly projecting spaced tabs on said band engageable with said dial panel to position said band in a predetermined telescoping position on the side wall of said base with portions of said band wall extending upwardly from the marginal edges of said support surfaces, said upwardly extending wall portions forming with each of said support surfaces a well for guidably receiving and retaining the receiving and transmitting elements of a handset positioned on said base.

References Cited

UNITED STATES PATENTS

| | | | |
|---|---|---|---|
| D. 186,668 | 11/1959 | Stevko | D26—14 |
| 2,479,198 | 8/1949 | Baker | 179—100 |

KATHLEEN H. CLAFFY, *Primary Examiner.*

L. A. WRIGHT, *Assistant Examiner.*